United States Patent
Jergess et al.

(10) Patent No.: US 10,118,470 B2
(45) Date of Patent: Nov. 6, 2018

(54) METHOD OF RE-INITIALIZING A VEHICLE POWER-OPERATED MOON ROOF OR SUNROOF

(71) Applicant: FORD GLOBAL TECHNOLOGIES, LLC, Dearborn, MI (US)

(72) Inventors: Rafic Jergess, Warren, MI (US); Spencer Monroe Dinkins, III, Rochester Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 93 days.

(21) Appl. No.: 15/472,400

(22) Filed: Mar. 29, 2017

(65) Prior Publication Data
US 2018/0281571 A1    Oct. 4, 2018

(51) Int. Cl.
*G06F 19/00* (2018.01)
*B60J 7/057* (2006.01)
*B60J 7/00* (2006.01)
*B60J 7/043* (2006.01)

(52) U.S. Cl.
CPC .......... *B60J 7/0573* (2013.01); *B60J 7/0038* (2013.01); *B60J 7/043* (2013.01)

(58) Field of Classification Search
None
See application file for complete search history.

(56) References Cited

U.S. PATENT DOCUMENTS

| | | | | |
|---|---|---|---|---|
| 4,422,687 A | * | 12/1983 | Kaltz | B60J 7/0573 296/221 |
| 4,923,244 A | | 5/1990 | Clenet | |
| 5,250,882 A | | 10/1993 | Odoi et al. | |
| 5,955,854 A | * | 9/1999 | Zhang | B60J 7/0573 318/264 |
| 6,056,352 A | | 5/2000 | Ewing et al. | |
| 8,303,031 B2 | | 11/2012 | Horiuchi et al. | |
| 8,789,878 B2 | | 7/2014 | Fraley | |
| 2015/0180471 A1 | | 6/2015 | Buttolo et al. | |

FOREIGN PATENT DOCUMENTS

JP    2004314908 A    11/2004

OTHER PUBLICATIONS

English Machine Translation of JP2004314908A.

* cited by examiner

*Primary Examiner* — Adam M Alharbi
(74) *Attorney, Agent, or Firm* — Jason Rogers; King & Schickli PLLC

(57) ABSTRACT

A method for re-initializing a moon roof control system includes sequentially re-initializing first a sunshade controller and then a moon roof panel controller. The step of sequentially re-initializing is implemented by actuating one or more sunshade and/or moon roof panel actuators for a predetermined re-initializing time period that is less than a full duration of the re-initializing.

17 Claims, 4 Drawing Sheets

METHOD OF RE-INITIALIZING A VEHICLE POWER-OPERATED MOON ROOF OR SUNROOF

TECHNICAL FIELD

This disclosure relates generally to vehicle moon roof/sunroof system. In particular, the disclosure relates to methods of re-initializing a moon roof/sunroof system.

BACKGROUND

Modern power-operated moon roof and sunroof assemblies conventionally include a sunshade, at least one moon roof panel or glass, one or more motors for separately translating the sunshade and at least one moon roof panel between an open and a closed position, and one or more controllers operatively associated with the one or more motors. For convenience, the moon roof assembly and associated controller(s) are often provided with "one touch open" and "one touch closed" functionalities allowing a user to fully open or fully close one or both of the moon roof panel and sunshade without having to press an actuator during the entire time the moon roof panel or sunshade is translating between the fully open and fully closed positions.

Occasionally it is necessary to re-initialize the one or more controllers associated with vehicle moon roof assemblies (also variously called a "re-learn" or "re-teach" procedure or mode), to ensure that for example the "one touch open" and "one touch closed" functions of the moon roof assembly remain available. It is also known that owners may cause the moon roof assembly controller(s) to enter the "re-learn" mode accidentally. Current processes for re-initializing moon roof assembly controller(s) require a user to press and hold one or more associated actuators for an entire duration of the "re-learn" cycle, which is inconvenient. Further, if the one or more associated actuators are released prior to the completion of the "re-learn" cycle, the process is interrupted and must be re-started.

To solve this and other problems, the present disclosure is directed to methods for implementing a re-initialization of one or more controllers associated with control of a moon roof assembly which do not require actuation of any actuators for the duration of the "re-learn" cycle.

SUMMARY

In accordance with the purposes and benefits described herein, in one aspect of the present disclosure a method for re-initializing a power-operated vehicle moon roof control system, comprising sequentially re-initializing first a sunshade controller and then a moon roof panel controller by actuating one or more actuators operatively associated with the moon roof assembly for a predetermined re-initializing time period that is less than a full duration of the re-initializing. The step of sequentially re-initializing may be preceded by a step of translating the moon roof assembly to a fully closed position. The sunshade controller and the moon roof panel controller may be the same or different controllers.

An initiation procedure may be implemented after translating the moon roof assembly to the fully closed position. In an embodiment, the initiation procedure comprises steps of placing a driver's side vehicle door in an open position and cycling a vehicle ignition device between an off position and an on position for a predetermined number of cycles within a predetermined initiation procedure time period.

In embodiments, the step of re-initializing the sunshade controller may comprise simultaneously actuating a sunshade close actuator and a moon roof panel open actuator. In embodiments, the step of re-initializing the moon roof panel controller may comprise actuating a moon roof panel close actuator for the predetermined re-initializing time period. In embodiments, the step of re-initializing the moon roof panel controller may comprise simultaneously actuating a moon roof panel close actuator and a sunshade open actuator for the predetermined re-initializing time period.

In the following description, there are shown and described embodiments of methods for implementing a re-initialization of one or more controllers associated with control of a moon roof assembly. As it should be realized, the described methods are capable of other, different embodiments and their several details are capable of modification in various, obvious aspects all without departing from the methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of methods for implementing a re-initialization of one or more controllers associated with control of a moon roof assembly, and together with the description serve to explain certain principles thereof. In the drawings.

Reference will now be made in detail to embodiments of methods for implementing a re-initialization of one or more controllers associated with control of a moon roof assembly, examples of which are illustrated in the accompanying drawing figures. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

DETAILED DESCRIPTION

Preliminarily, the various aspects of the described methods for implementing a re-initialization of one or more controllers associated with control of a moon roof assembly are discussed primarily in the context of a moon roof assembly. However, it will readily be appreciated that the methods are equally applicable to other translatable panels, for example sunroof assemblies, powered side and/or rear windows, and the like. Moreover, the specific devices, control mechanisms, software, and manner of operation of these elements associated with a vehicle moon roof or sunroof assembly as described herein are well known in the art and do not require extensive description herein. Certain of these features are shown herein in block form for convenience and ease of illustration.

Figure 1:
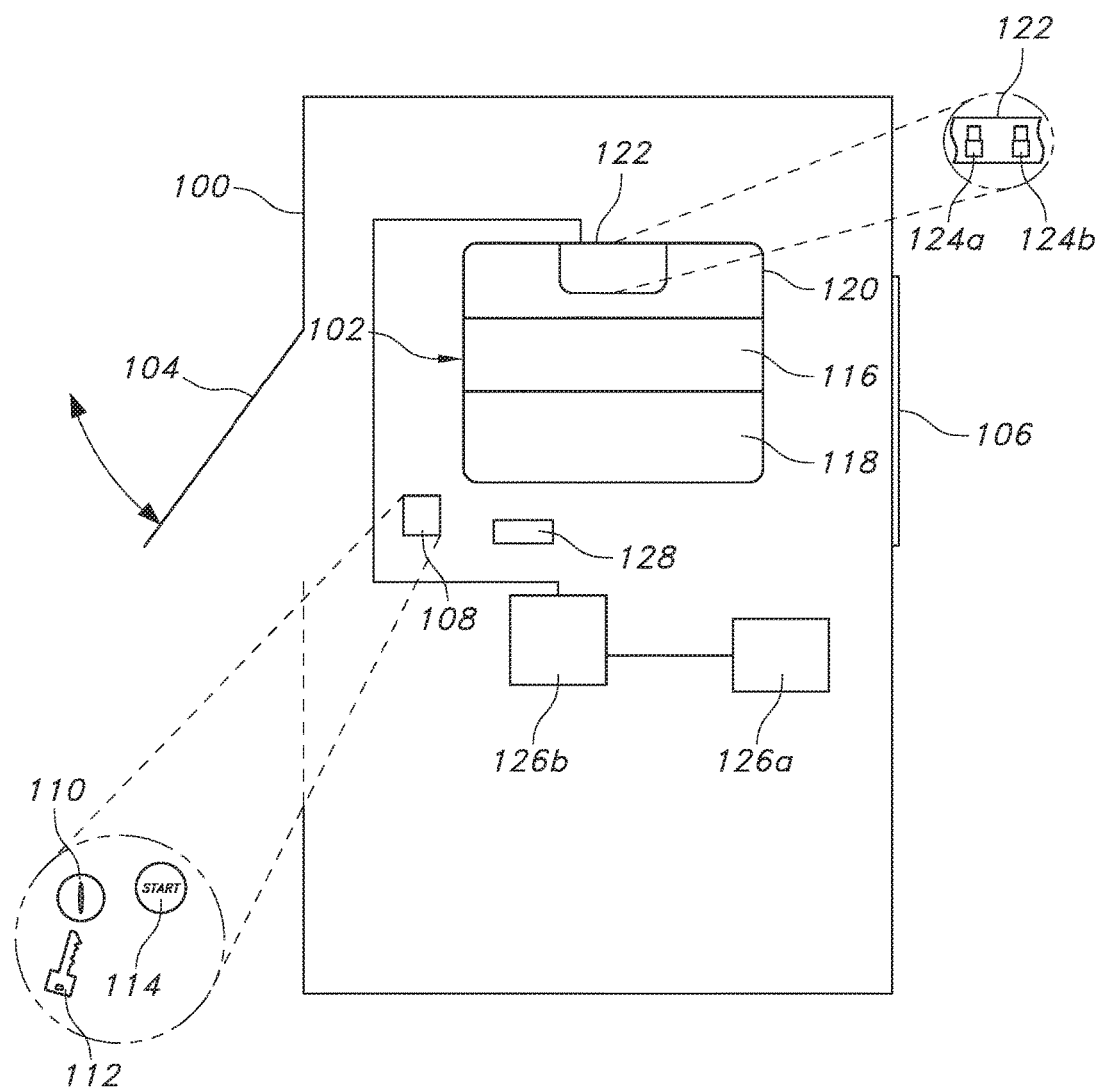
FIG. 1 shows a vehicle including a moon roof assembly according to the present disclosure.

FIG. 1 illustrates a vehicle 100 including a moon roof assembly 102. The vehicle 100 includes a number of doors, including at least a driver's side door 104 and a passenger's side door 106. The vehicle 100 further includes an ignition device 108, which as is known is most typically disposed on or near a steering column (not shown). Various ignition devices 108 are known, including as shown an ignition switch 110 actuated by a key 112 and a start button 114 operatively linked to a smart key or key fob (not shown).

The moon roof assembly 102 includes a power-operated sunshade 116 and a moon roof panel 118, each separately actuable and dimensioned to occlude an aperture 120 defined in the vehicle 100 roof panel. As is known, the sunshade 116 and a moon roof panel 118 are typically arranged in a stacked configuration, most often with the sunshade underneath the moon roof panel, and are adapted to retract into a receiver (not shown) within the roof panel or between the roof panel and a headliner (not shown).

A control panel 122 is provided, including one or more actuators 124 for actuating translation of the sunshade 104 and/or the moon roof panel 106. In the depicted embodiment, actuators 124a, 124b are provided, each separately controlling one of the sunshade 104 and moon roof panel 106. However, it is also known to provide a single actuator 112 for controlling both. Any number of suitable actuators 124 are known in the art and contemplated for use herein, including without intending any limitation buttons, switches, capacitive switches, and the like.

The moon roof assembly 102 further includes one or more controllers 126a . . . n comprising one or more processors, one or more memories, and storage, further being provided with logic for controlling actuation of the sunshade 116 and moon roof panel 118. The moon roof assembly 102 may be controlled by a single centralized controller such as the Body Control Module (BCM) 126a, by dedicated Electronic Control Units (ECU) 126b, or by combinations.

Figure 2:
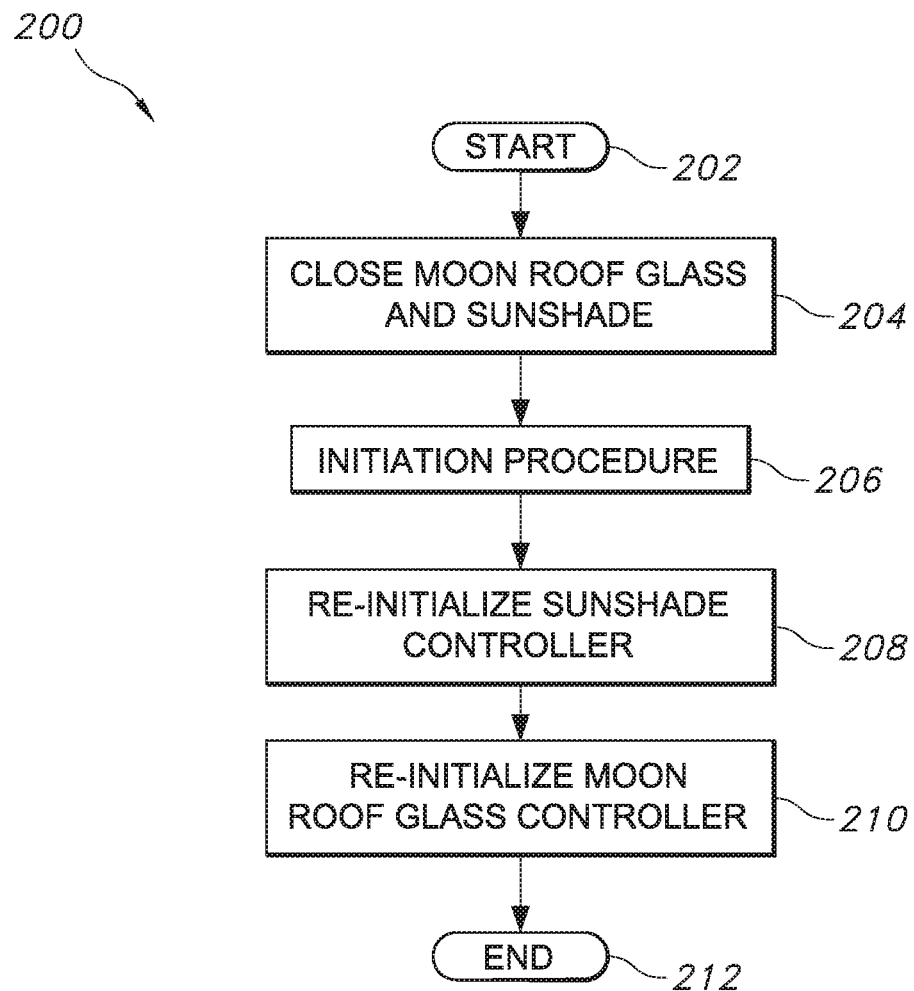
FIG. 2 shows an embodiment of a method according to the present disclosure for controlling a moon roof assembly as shown in FIG. 1.

FIG. 2 illustrates at a high level in flow chart form a method 200 for re-initializing a power-operated moon roof assembly 102. At step 202, a need for the re-initializing is identified. This may occur as part of a servicing procedure wherein electrical power to the vehicle 100 components is interrupted necessitating a "re-boot" of all computerized systems, or as noted above is on occasion caused accidentally by a vehicle owner. To begin the re-initialization process, the sunshade 116 and moon roof panel 118 are translated each translated to a fully closed position (step 204).

Next (step 208), an initiation procedure is completed which alerts the moon roof assembly controller(s) 126 that re-initialization of the sunshade 116 controller and moon roof assembly 118 controller (which as noted above may be the same or different controllers) is required. Next, at step 208 the sunshade 116 controller is re-initialized. Next, the moon roof panel 118 controller is re-initialized. As will be described below, unlike conventional procedures as summarized above each of these re-initialization steps as described occurs without requiring a user such as service personnel or a vehicle owner to actuate any of actuators 124 for the full duration of the re-initializing of the controllers 126. Once the re-initialization or "relearn" cycle of the moon roof panel 118 controller is completed, the process ends (step 212) and the sunshade 116 and moon roof panel 118 "one touch open/close" functionalities are restored.

Figure 3:
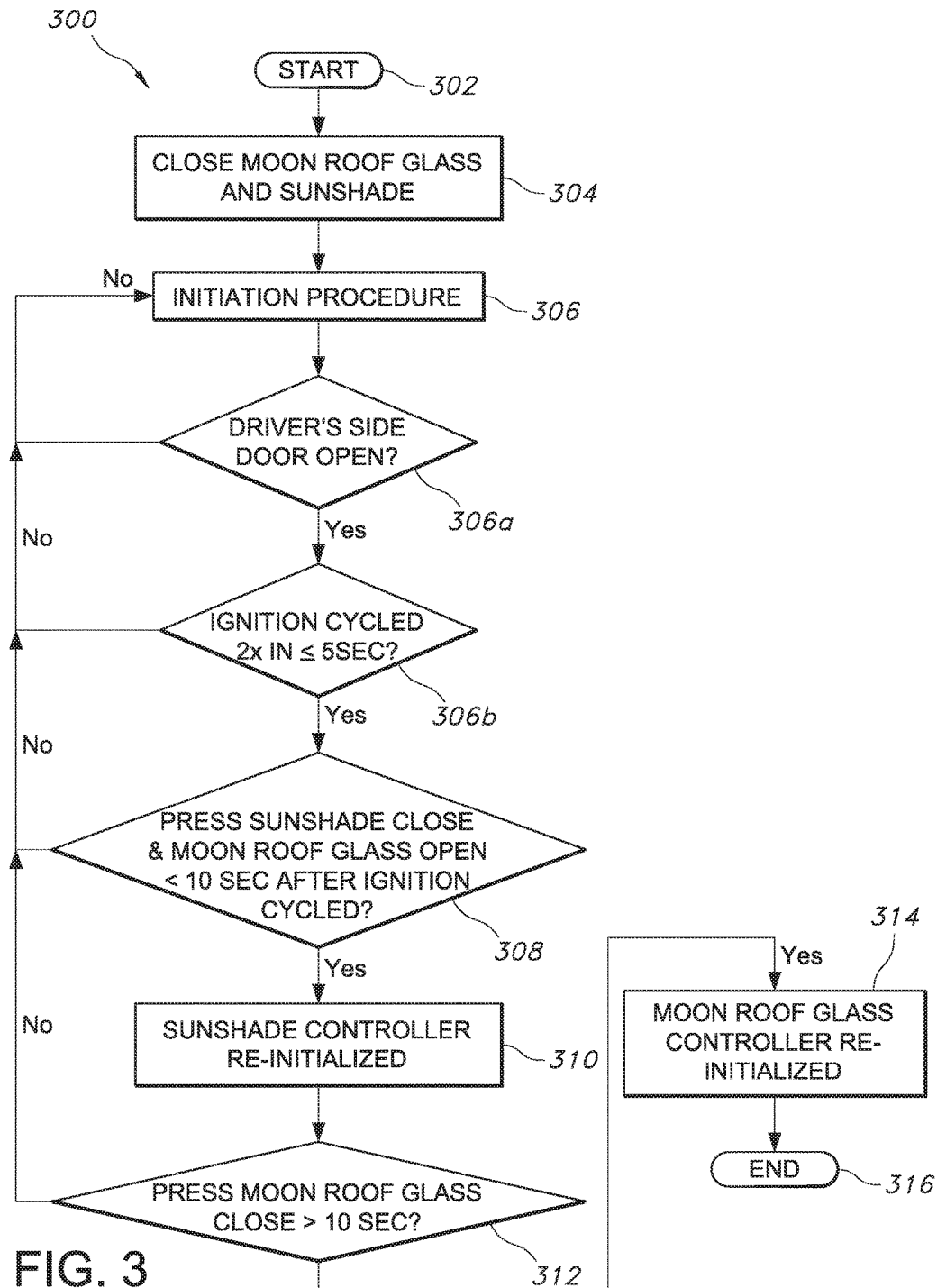
FIG. 3 shows in more detail an embodiment of the method of FIG. 2.

FIG. 3 illustrates in more detail an embodiment of the high-level method shown in FIG. 2. In the depicted embodiment, a method 300 for re-initializing a power-operated moon roof assembly 102 includes steps of closing a sunshade 116 and moon roof panel 118 to a fully closed position (step 304) and completing an initiation procedure (step 306) to alert the moon roof assembly controller(s) 126 that re-initialization of the sunshade 116 controller and moon roof assembly 118 controller (which as noted above may be the same or different controllers) is required.

In an embodiment, a first step (step 306a) of the initiation procedure is to open the driver's side door 104. Next, at step 306b the vehicle ignition device 108 is cycled between an "off" position and an "on" position for a predetermined number of times and within a predetermined initiation procedure time period. In the depicted embodiment the predetermined number of "off" "on" cycles is two and the predetermined initiation procedure time period is five seconds, although of course alternative cycles and/or time periods are contemplated. The form of cycling the vehicle ignition device 108 varies according to the specific ignition device. For example, in one embodiment wherein the vehicle 100 is equipped with an ignition switch 110 and cooperating key 110, the ignition switch may be cycled between an "off" position and a "delay accessory on" position. For a vehicle 100 equipped with a starter button 114, the starter button may be pressed for the requisite number of times. This is typically performed without depressing the vehicle brake pedal 128 to prevent starting the vehicle engine (not shown).

Next, at step 308 the user presses the sunshade actuator 124a and moon roof panel actuator 124b in a manner which the controller(s) 126 are configured to interpret as a desired "sunshade 116 close" command and a "moon roof panel 118 open" command. In the embodiment of FIG. 3, this causes re-initialization of the sunshade 116 controller (step 310).

Next is a step of re-initializing the moon roof panel 118 controller by a user pressing the moon roof panel actuator 124b for a pre-determined re-initializing time period that is less than a full duration of the re-initialization process. In the depicted embodiment this pre-determined re-initializing time period is more than 10 seconds, although alternative time periods are of course possible and contemplated. This step causes the moon roof panel 118 controller to enter a re-initialization cycle (step 312). Once the re-initialization or "relearn" cycle of the moon roof panel 118 controller is completed, the process ends (step 314) and the sunshade 116 and moon roof panel 118 "one touch open/close" functionalities are restored.

Figure 4:
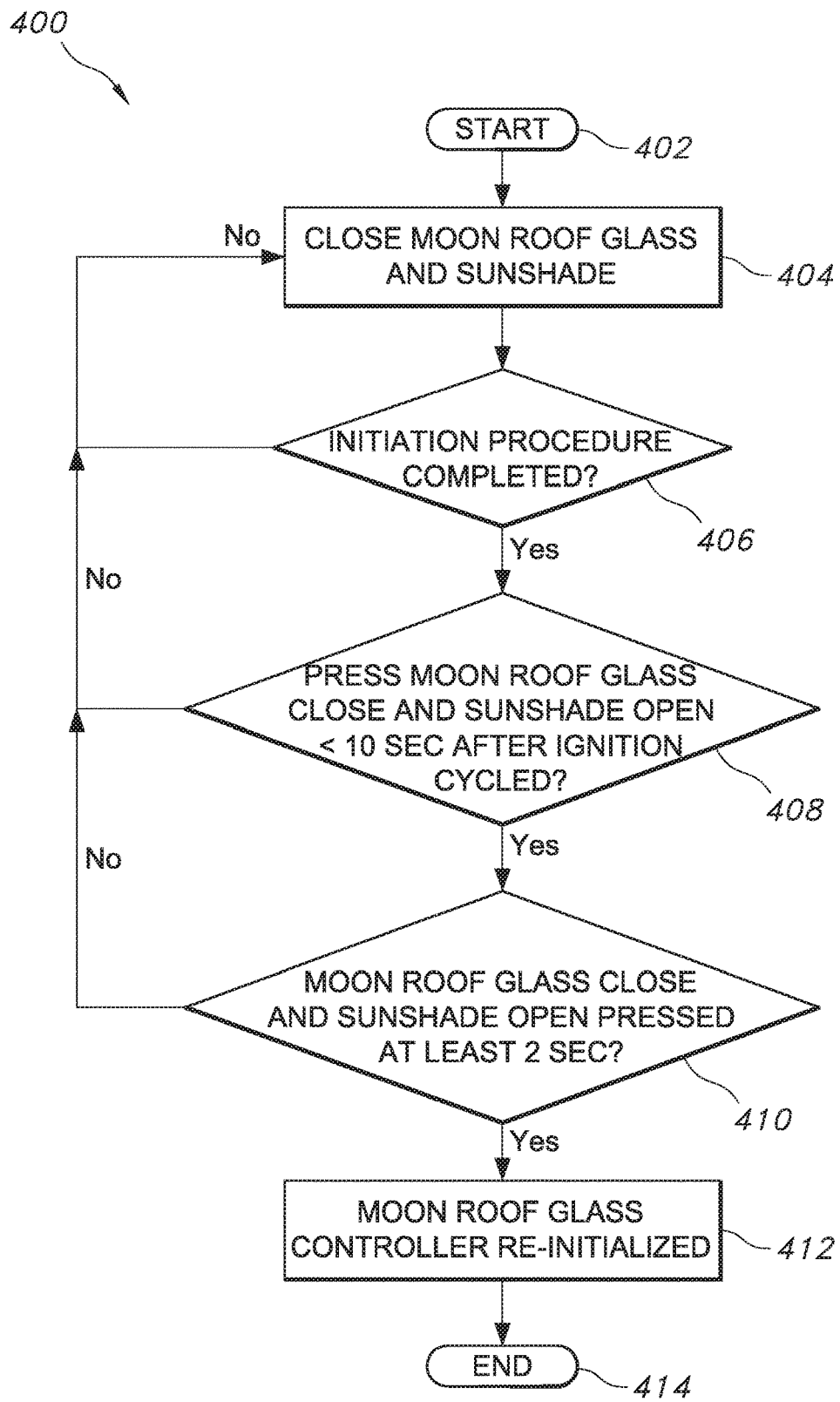
FIG. 4 shows in more detail an alternative embodiment of the method of FIG. 2.

FIG. 4 illustrates an alternative embodiment of a method for re-initializing a power-operated moon roof assembly 102. Method 400 includes steps 404 of closing a sunshade 116 and moon roof panel 118 to a fully closed position and completing an initiation procedure (step 406) substantially as described above in the discussion of FIG. 3.

Next, at step 408, within a predetermined time period after the initiation procedure of step 406 is completed, the user presses the sunshade actuator 124a and moon roof panel actuator 124b in a manner which the controller(s) 126 are configured to interpret as a desired "sunshade 116 open" command and a "moon roof panel 118 close" command. The user is required to press the actuators 124 as described for a pre-determined re-initializing time period (step 410) that is less than a full duration of the re-initializing process. In the embodiment of FIG. 4, this pre-determined re-initializing time period may be at least 2 seconds, although of course other time frames are possible and contemplated. This step causes the moon roof panel 118 controller to enter a re-initialization cycle (step 412). Once the re-initialization or "relearn" cycle of the moon roof panel 118 controller is completed, the process ends (step 414) and the sunshade 116 and moon roof panel 118 "one touch open/close" functionalities are restored.

The skilled artisan will readily appreciate that numerous advantages accrue from the described re-initialization procedures described herein. As described above, on re-initialization the sunshade 116 remains in a fully closed position. Advantageously, this allows the process of re-initialization of the moon roof panel 118 controller to proceed without risk of inadvertently placing an obstacle in the path of translation of the moon roof panel (for example, by a user interposing her arm in the path of travel of the moon roof panel) which would impede or abort the re-initialization procedure. In turn, as described above the re-initialization procedures do not require a user to press the sunshade 116 and/or moon roof panel 118 actuators 124 during the entire duration of the re-initialization procedure. Thus, unlike conventional procedures which do require a user to press an actuator for a full duration of re-initialization, releasing an actuator 124 prior to a controller 126 entering its re-initialization or "re-learn" cycle will not cause the process to abort and require re-starting.

Obvious modifications and variations are possible in light of the above teachings. All such modifications and variations are within the scope of the appended claims when interpreted in accordance with the breadth to which they are fairly, legally and equitably entitled.

What is claimed:

1. In a power-operated moon roof assembly comprising a sunshade and a moon roof panel, a method for re-initializing a moon roof control system, comprising:
    translating the moon roof panel and the sunshade to a fully closed position;
    sequentially re-initializing first a sunshade controller and then a moon roof panel controller
    by actuating one or more sunshade and/or moon roof panel actuators for a predetermined re-initializing time period that is less than a full duration of the re-initializing; and
    implementing an initiation procedure.

2. The method of claim 1, wherein the sunshade controller and the moon roof panel controller are the same or different.

3. The method of claim 1, wherein the initiation procedure comprises placing a driver's side vehicle door in an open position and cycling a vehicle ignition device between an off position and an on position for a predetermined number of cycles within a predetermined initiation procedure time period.

4. The method of claim 3, wherein the predetermined number of cycles is two and the predetermined initiation procedure time period is five seconds.

5. The method of claim 4, wherein the initiation procedure includes, by an ignition key, cycling a vehicle ignition switch between the off position and a delay accessory on position.

6. The method of claim 4, wherein the initiation procedure includes actuating a vehicle start button without depressing a vehicle brake pedal.

7. The method of claim 2, wherein the step of re-initializing the sunshade controller comprises simultaneously actuating a sunshade close actuator and a moon roof panel open actuator.

8. The method of claim 2, wherein the step of re-initializing the moon roof panel controller comprises actuating a moon roof panel close actuator for the predetermined re-initializing time period.

9. The method of claim 8, wherein the predetermined re-initializing time period is at least 10 seconds but less than the full duration of the re-initializing.

10. The method of claim 2, wherein the step of re-initializing the moon roof panel controller comprises simultaneously actuating a moon roof panel close actuator and a sunshade open actuator for the predetermined re-initializing time period.

11. The method of claim 10, wherein the predetermined re-initializing time period is at least 2 seconds but less than the full duration of the re-initializing.

12. A method for re-initializing a power-operated vehicle moon roof control system, comprising in sequence:
    translating a moon roof assembly comprising a moon roof panel and a sunshade to a fully closed position;
    implementing an initiation procedure comprising placing a driver's side vehicle door in an open position and cycling a vehicle ignition device between an off position and an on position for a predetermined number of cycles within a predetermined initiation procedure time period; and
    sequentially re-initializing first a sunshade controller and then a moon roof panel controller by actuating one or more sunshade and/or moon roof panel actuators for a predetermined re-initializing time period that is less than a full duration of the re-initializing;
    wherein the step of re-initializing the moon roof panel controller comprises actuating a moon roof panel close actuator for the predetermined re-initializing time period.

13. The method of claim 12, wherein the sunshade controller and the moon roof panel controller are the same or different.

14. The method of claim 13, wherein the step of re-initializing the sunshade controller comprises simultaneously actuating a sunshade close actuator and a moon roof panel open actuator.

15. The method of claim 13, wherein the predetermined re-initializing time period is at least 10 seconds but less than the full duration of the re-initializing.

16. The method of claim 13, wherein the step of re-initializing the moon roof panel controller comprises simultaneously actuating a moon roof panel close actuator and a sunshade open actuator for the predetermined re-initializing time period.

17. The method of claim 16, wherein the predetermined re-initializing time period is at least 2 seconds but less than the full duration of the re-initializing.

* * * * *